United States Patent [19]

Andrews

[11] Patent Number: 4,724,368
[45] Date of Patent: Feb. 9, 1988

[54] MULTIPLE PHASE ELECTRONICALLY COMMUTATED TORQUE MOTOR

[75] Inventor: Harold E. Andrews, Simi Valley, Calif.

[73] Assignee: Huges Aircraft Co., Los Angeles, Calif.

[21] Appl. No.: 812,534

[22] Filed: Dec. 23, 1985

[51] Int. Cl.[4] .............................................. H02P 6/02
[52] U.S. Cl. .................................. 318/439; 318/689; 310/68 R
[58] Field of Search ............... 318/138, 254, 439, 689; 310/68 R, 216, 267

[56] References Cited

U.S. PATENT DOCUMENTS

| | | | |
|---|---|---|---|
| 4,283,664 | 8/1981 | Ebert | 318/254 A X |
| 4,373,148 | 2/1983 | Gutz | 318/138 X |
| 4,547,713 | 10/1985 | Langley et al. | 310/68 R X |

FOREIGN PATENT DOCUMENTS 55-74394  6/1980  Japan ................................. 318/254

OTHER PUBLICATIONS

Torque Motor Handbook and Product Selection Guide, Published by Litton Industries–Clifton Precision, pp. 1-1 through 4-1 (1983).

*Primary Examiner*—Bentsu Ro
*Attorney, Agent, or Firm*—Charles D. Brown; A. W. Karambelas

[57] ABSTRACT

A multiple phase electronically commutated torque motor including an annular stator element having at least two coils or windings on the periphery thereof and a magnetic rotor disposed concentrically within the stator for relative coplanar rotational motion. Means are provided for selectively energizing and de-energizing the windings as a function of the instantaneous rotor angle on command to generate a desired torque.

6 Claims, 6 Drawing Figures

MULTIPLE PHASE ELECTRONICALLY COMMUTATED TORQUE MOTOR

BACKGROUND OF THE INVENTION

1. Field of the Invention

The present invention relates to navigation systems. More, specifically, the present invention relates to torque motors for use in connection with gimbaled gyroscopes.

The present invention is described herein with reference to a particular embodiment for use in a particular application. As discussed more fully below, those having ordinary skill in the art and access to the teachings of the present invention will recognize additional modifications and embodiments within the scope thereof.

2. Description of the Related Art

A torque motor is a motor that provides a controlled torque over an angular excursion to control the orientation of a gimbaled or free gyroscope in an inertial navigation system. As such devices are typically sensitive to disturbance torques, it is generally desirable that the torque motor have minimum spurious coupling torques. That is, the torque motor should operate with minimal magnetic reluctance torques (cogging) and with minimal magnetic hysteresis (friction).

Cogging is the undesirable tendency of a rotor to seek preferred positions and to cause torque pulsations (ripple torques during rotation). Cogging occurs when the edge of a rotor magnet is in the vicinity of a slot between the windings of the stator.

Friction is the undesireable tendency of the torque motor rotor to respond to residual magnetism in the stator. Thus, motion of the gimbal produces a torque between the rotor and stator in the command zero mode (i.e., when a zero torque command is present) and a dissipation of energy as heat when the rotor is commanded to apply a torque in one direction or another.

Two basic torque motor designs are the limited rotation design, made by Aeroflex, Vernitron and others, and the slot wound brush or electronically commutated design made by Inland, TRW Motors and others.

The limited rotation designs are characterized by a brushless DC motor wit a toroidally wound stator that provides ripple-free torque over a limited angular excursion without commutation. As no slots are utilized in this design, cogging is virtually eliminated. The rotor is usually well spaced from the stator allowing for minimum magnetic friction as well.

Unfortunately, limited rotation designs are typically power inefficient because part of the coil winding is often unused. In addition, such designs often suffer from transfer function nonlinearity (torque non-constancy as a function of angle) due to the variation in torque at the extremes of the range of motion.

Commutated or slotted designs are more similiar to conventional motors. As such, these designs typically exhibit good power performance because the windings may be bunched or concentrated in optimal locations. On the other hand, commutated or slotted designs exhibit the poor cogging and friction characteristics mentioned above. Also, such designs often suffer from transfer function nonlinearity due to ripple torques ie. the peak variations in torque resulting from the switching effect of commutation. Thus, there exists a general need in the art to provide a torque motor that exhibits good power efficiency, minimal cogging, minimal magnetic friction, and good transfer function linearity.

SUMMARY OF THE INVENTION

The shortcomings of the prior art are addressed by the present invention which provides a multiple phase electronically commutated torque motor with minimal disturbance torques.

The illustrative embodiment of the invention includes an annular stator element having at least two coils or windings on the periphery thereof. A magnetic rotor is disposed concentrically within the stator for relative coplanar rotational motion. Means are provided for selectively energizing and de-energizing the windings as a function of rotor angle to generate a desired torque.

An alternative embodiment of the invention provides an annular external rotor, with magnetic elements, which rotates about a stator having at least two windings. Once again, the windings are selectively energized and deenergized as a function of the relative angle between the rotor and the stator to generate a desired torque.

An improved method of energizing a motor is thus disclosed whereby the windings of a motor are selectively energized to provide efficient motor operation with minimal disturbance torques.

DESCRIPTION OF THE INVENTION

As described in detail below, the present invention provides a multiple phase electronically commutated torque motor. The invention includes a stator with a plurality of toroidally wound windings (phases), a multiple pole magnetic rotor, and a control system for selectively de-energizing particular windings while energizing others as a function of the position of the rotor. Thus, smooth or low ripple torque as a function of rotor to stator angle is provided by instantaneously energizing all phases but one. The energized phases are sequenced or stepped at predetermined angles. Magnetic fields are thereby created which exert minimal forces on the edges of certain poles and positive or negative tangential forces on the other poles. The magnitude and direction of the torque is determined by command.

Figure 1:
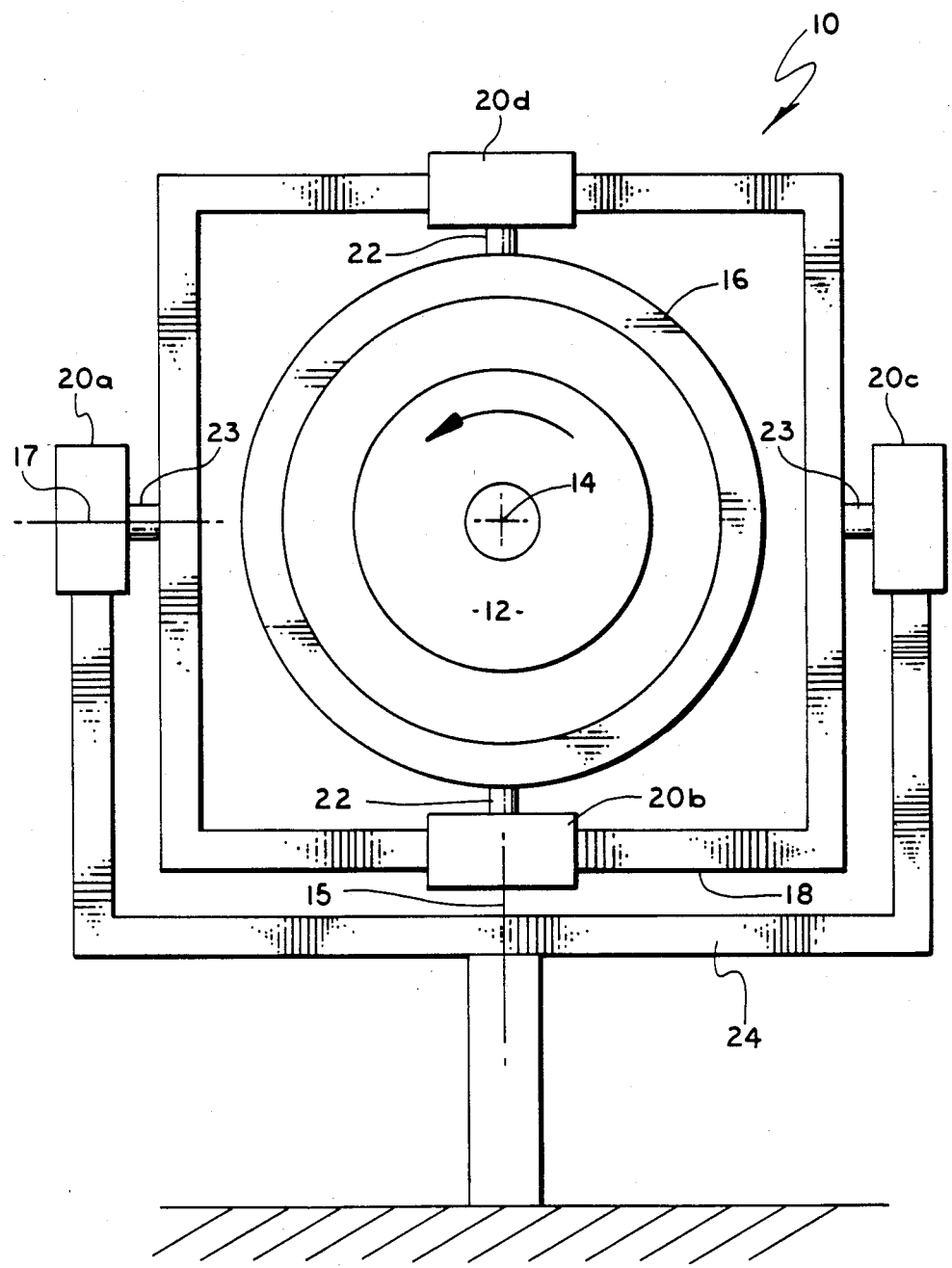
FIG. 1 is a simplified representation of a conventional gimbaled platform with multiple torques in appropriate positions.

For the purposes of explanation, FIG. 1 shows how a torque motor is integrated into a typical gimbaled gyroscope apparatus 10. The apparatus 10 typically includes a spinning flywheel 12 having a pivot or axis of rotation 14. The flywheel 12 is mounted on an inner gimbal 16 which in turn is mounted on an outer gimbal 18. The point of engagement of the inner gimbal 16 with the outer gimbal 18 is typically controlled by torque motors 20b and 20d as shown. As discussed in the operation below, the torque motors 20b and 20d exert torques on the inner gimbal axis 15 on command. The torque is directed in a clockwise or counter-clockwise direction. The axis of rotation 14 of the spinning flywheel responds by precessing (rotating) about the outer gimbal axis 17. Similarly, a second set of torque motors 20a and 20c operate between the outer gimbal 18 and the supporting frame or pedestal 24 to cause the axis of rotation 14 of the flywheel 12 to precess about the inner gimbal axis 15.

Figure 2:
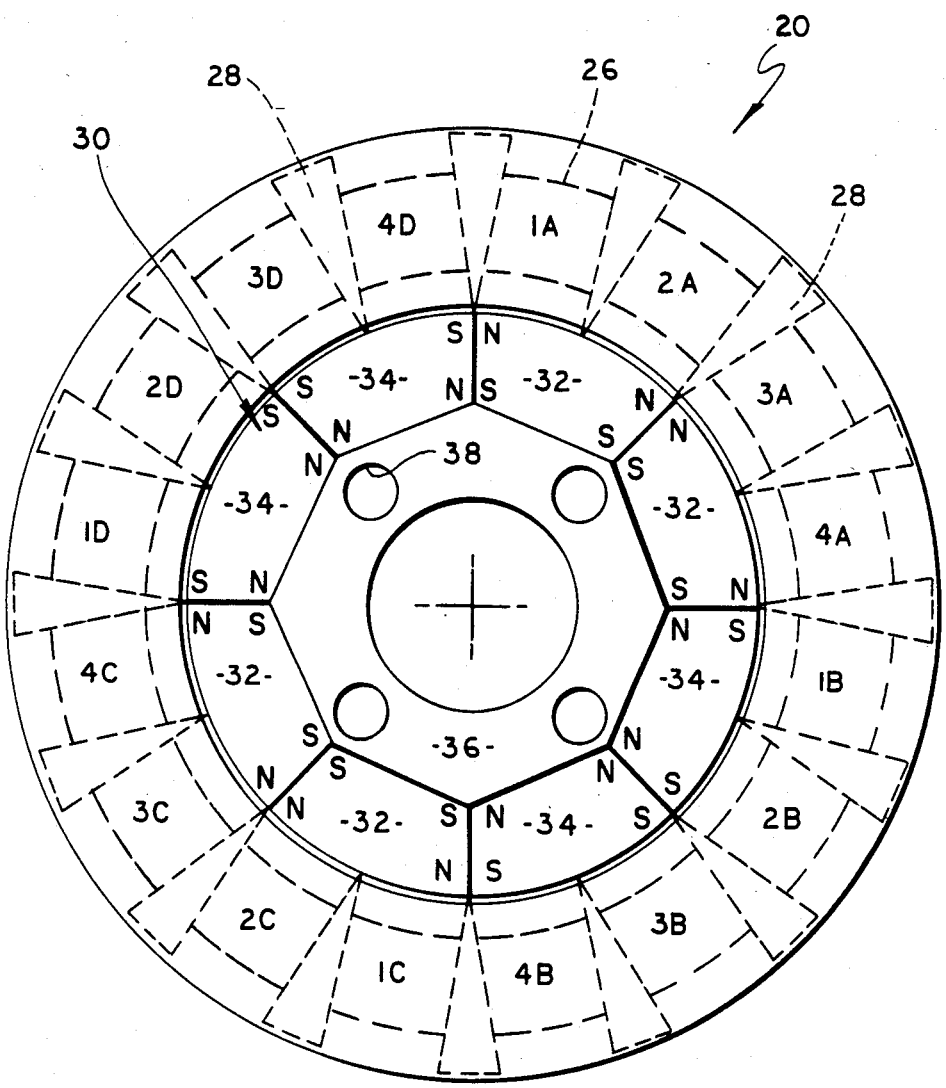
FIG. 2 is a top plan view of an illustrative embodiment of the present invention.

As shown in greater detail in the illustrative embodiment of FIG. 2, the torque motors 20 include an annular stator 26 (shown hidden), a plurality of coils 1-4 and a magnetic rotor 30.

Figure 3:
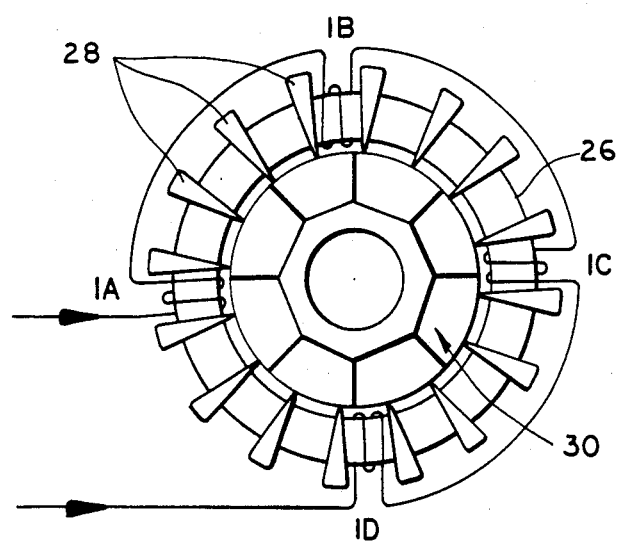
FIG. 3 is a simplified top plan view of an illustrative embodiment of the present invention.

The stator 26 is made of a suitable soft iron such as low carbon steel, silicon, speciality steels, or high flux carrying materials such as vanadium permadur. As shown in FIG. 3, a plurality of wedge-shaped winding separators 28 are mounted around the periphery of the stator 26. The winding separators 28 are bonded to the stator 26. The separators 28 are made of phenolic or other suitable insulative material.

The coils 1-4 each have four windings toroidally wound about the stator 26, thus providing four phases as discussed more fully below. FIG. 3 shows a single coil 1 with windings 1A, 1B, 1C, and 1D. Note that windings 1A and 1C are oppositely wound relative to windings 1B and 1D to create magnetic forces of opposite directions. When current flows in one direction, windings 1A and 1C create a field effective to force a north pole of the rotor 30 in say a clockwise direction while windings 1B and 1D generate fields effective to force a south pole of the rotor 30 in the clockwise direction. Conversely, when current flows in the opposite direction, windings 1A and 1C generate fields effective to force a south pole of the rotor 30 in a counter-clockwise direction while windings 1B and 1D generate fields effective to force a north pole of rotor 30 in a counter-clockwise direction.

Similarly, the coils 2, 3 and 4 have four windings alternatively oppositely toroidally wound to provide four magnetic phases. The separators 28 serve to insulate the windings from each other. The number of turns of the coils is determined by the magnet design in a manner known in the art.

Returning now to FIG. 2, the rotor 30 is mounted concentrically within the stator 26. The rotor 30 consists of a number of permanent magnets 32 and 34 bonded together and bonded to a soft iron hub 36. The magnets 32 and 34 are made of samarium cobalt or other suitable magnetic material. Magnets 32 are charged with a north pole polarity. Similarly, magnets 34 are charged with a south pole polarity. Two magnets are used to form four magnetic poles while maintaining a nearly radial flux distribution. The diameter of the rotor 30 is such as to provide sufficient clearance relative to the stator 26.

Figure 4:
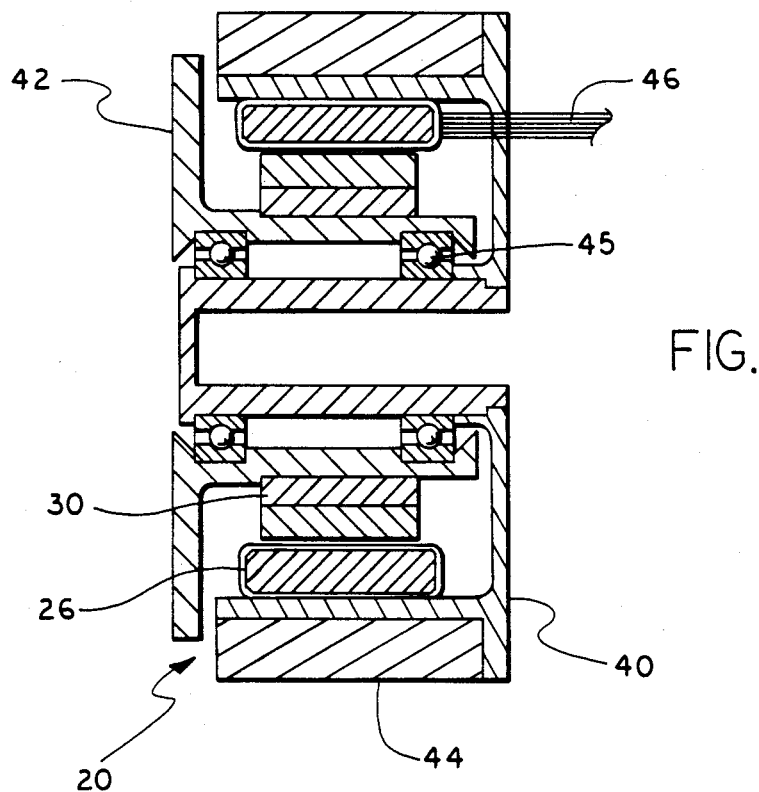
FIG. 4 is a cross-sectional side view of an illustrative embodiment of the present invention with fixtures attached.

FIG. 4 shows a cross-sectional side elevational view of the illustrative embodiment of FIG. 2 with exemplary mounting hardware and fixtures. Thus, a first fixture 40 is attached to the stator 26. A second fixture 42 is attached to the rotor 42. The torquer 20 is secured to a gimbal 16 or 18 or pedestal 24 at plate 44. Wires 46 connected to coils 1-4 extend through fixture 40 to control circuitry (not shown). The fixtures 40 and 42 may be separated by bearing 45. It is understood that other fixtures may be used as necessary to suit a particular application.

Figure 5:
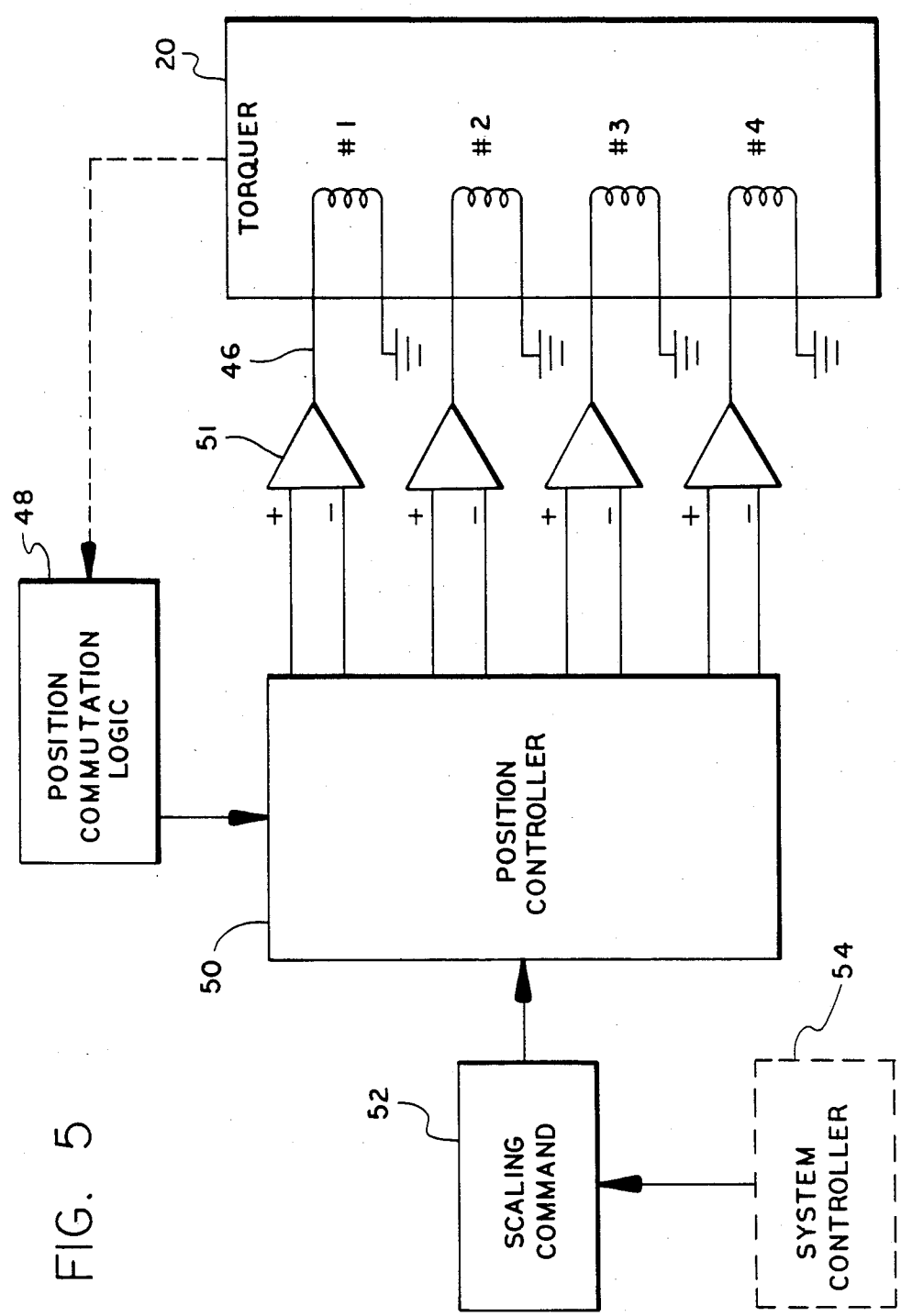
FIG. 5 is an illustrative diagrammatic representation of a control system of the present invention.

FIG. 5 shows a block diagram representation of an illustrative control system for selectively energizing the coils 1-4 of the torque motor 20 of the present invention. Position commutation logic 48 provides a indication of the angle of the inner gimbal 16 or the outer gimbal 18. Such information is typically provided by the navigation system within which the torquer 20 operates. Alternatively, as is known to those skilled in the art, embedded commutation logic devices may be utilized to determine the position of the gimbals 16 or 18 and the position of the rotor 30 relative to the stator 26.

A controller 50 receives signals indicative of the position of the rotor 30 from the commutation logic 48 and provides selective energization of the coils 1-4. In the preferred embodiment, the controller 50 is implemented with a micro-processor and includes A/D and D/A converters, ROM and RAM memory, clock and interface logic as is known in the art. It is understood that the controller may be implemented with discrete components.

The controller 50 operates on the coils 1-4 through bi-directional amplifiers 51. The strength of the signal output by the controller 50 to drive the coils 1-4 is determined with reference to a signal from a scaling command circuit 52. The scaling command circuit 52 responds to signals from a system controller 54 to communicate to the torquer controller 50 the magnitude of the current to be driven into the selected coils to apply the command torque.

OPERATION

The invention may operate in a closed-loop system wherein a rate detector may be used as a system input or in an open-loop system wherein the system input is by command.

In the illustrative open-loop system of FIG. 5, the system controller 54 initiates operation by providing a torque command to the scaling circuit 52. The scaling circuit 52 translates the command into a signal of appropriate magnitude and supplies it to the position controller 50 where it is converted to a digital signal. The signal is either used to calculate the coil driver outputs or as part of an address to look up the coil driver outputs in a table stored in ROM depending on the implementation of the controller 50. The position controller 50 provides a signal to the appropriate amplifiers 51 to energize selected coils 1, 2, 3 and/or 4 with current of the thus provided magnitude and direction.

Assuming that a command is received to cause the axis of rotation 14 of the flywheel 12 of FIG. 1 to precess about the outer gimbal axis 17, torque motors 20b and 20d will be commanded to apply a torque about the inner gimbal axis 15 to the inner gimbal 16.

As shown in FIG. 4, the torque motor 20b or 20d would, for example, be connected to the outer gimbal 18 by the stator fixture 40 and the inner gimbal 16 by the rotor fixture 42 so that as the two fixtures 40 and 42 rotated, a force or torque would be applied to the inner gimbal 16.

To achieve the desired direction and magnitude of torque, the coils 1-4 are selectively energized as shown in Tables 1 and 2 below:

TABLE 1A

CURRENT POLARITY FOR CLOCKWISE COMMANDS

| (+) Instantaneous Angular Positions | | Coil # | | | |
|---|---|---|---|---|---|
| from | to | 1 | 2 | 3 | 4 |
| 0 | +11.25 | 0 | + | + | + |
| +11.25 | +33.75 | − | 0 | + | + |
| +33.75 | +56.25 | − | − | 0 | + |
| +56.25 | +78.75 | − | − | − | 0 |
| +78.25 | +101.25 | 0 | − | − | − |
| +101.25 | +123.75 | + | 0 | − | − |
| +123.75 | +146.25 | + | + | 0 | − |
| +146.25 | +168.75 | + | + | + | 0 |
| +168.75 | +180.00 | 0 | + | + | + |

TABLE 1B

CURRENT POLARITY FOR CLOCKWISE COMMANDS

| (−) Instantaneous Angular Positions | | Coil # | | | |
|---|---|---|---|---|---|
| from | to | 1 | 2 | 3 | 4 |
| 0 | −11.25 | 0 | + | + | + |
| −11.25 | −33.75 | + | + | + | 0 |
| −33.75 | −56.25 | + | + | 0 | − |
| −56.25 | −78.75 | + | 0 | − | − |
| −78.25 | −101.25 | 0 | − | − | − |
| −101.25 | −123.75 | − | − | − | 0 |
| −123.75 | −146.25 | − | − | 0 | + |
| −146.25 | −168.75 | − | 0 | + | + |
| −168.75 | −180.00 | 0 | + | + | + |

TABLE 2A

CURRENT POLARITY FOR COUNTER-CLOCKWISE COMMANDS

| (+) Instantaneous Angular Positions | | Coil # | | | |
|---|---|---|---|---|---|
| from | to | 1 | 2 | 3 | 4 |
| 0 | −11.25 | 0 | − | − | − |
| −11.25 | −33.75 | + | 0 | − | − |
| −33.75 | −56.25 | + | + | 0 | − |
| −56.25 | −78.75 | + | + | + | 0 |
| −78.25 | −101.25 | 0 | + | + | + |
| −101.25 | −123.75 | − | 0 | + | + |
| −123.75 | −146.25 | − | − | 0 | + |
| −146.25 | −168.75 | − | − | − | 0 |
| −168.75 | −180.00 | 0 | − | − | − |

TABLE 2B

CURRENT POLARITY FOR COUNTER-CLOCKWISE COMMANDS

| (−) Instantaneous Angular Positions | | Coil # | | | |
|---|---|---|---|---|---|
| from | to | 1 | 2 | 3 | 4 |
| 0 | −11.25 | 0 | − | − | − |
| −11.25 | −33.75 | − | − | − | 0 |
| −33.75 | −56.25 | − | − | 0 | + |
| −56.25 | −78.75 | − | 0 | + | + |
| −78.25 | −101.25 | 0 | + | + | + |
| −101.25 | −123.75 | + | + | + | 0 |
| −123.75 | −146.25 | + | + | 0 | − |
| −146.25 | −168.75 | + | 0 | − | − |
| −168.75 | −180.00 | 0 | − | − | − |

Figure 6:
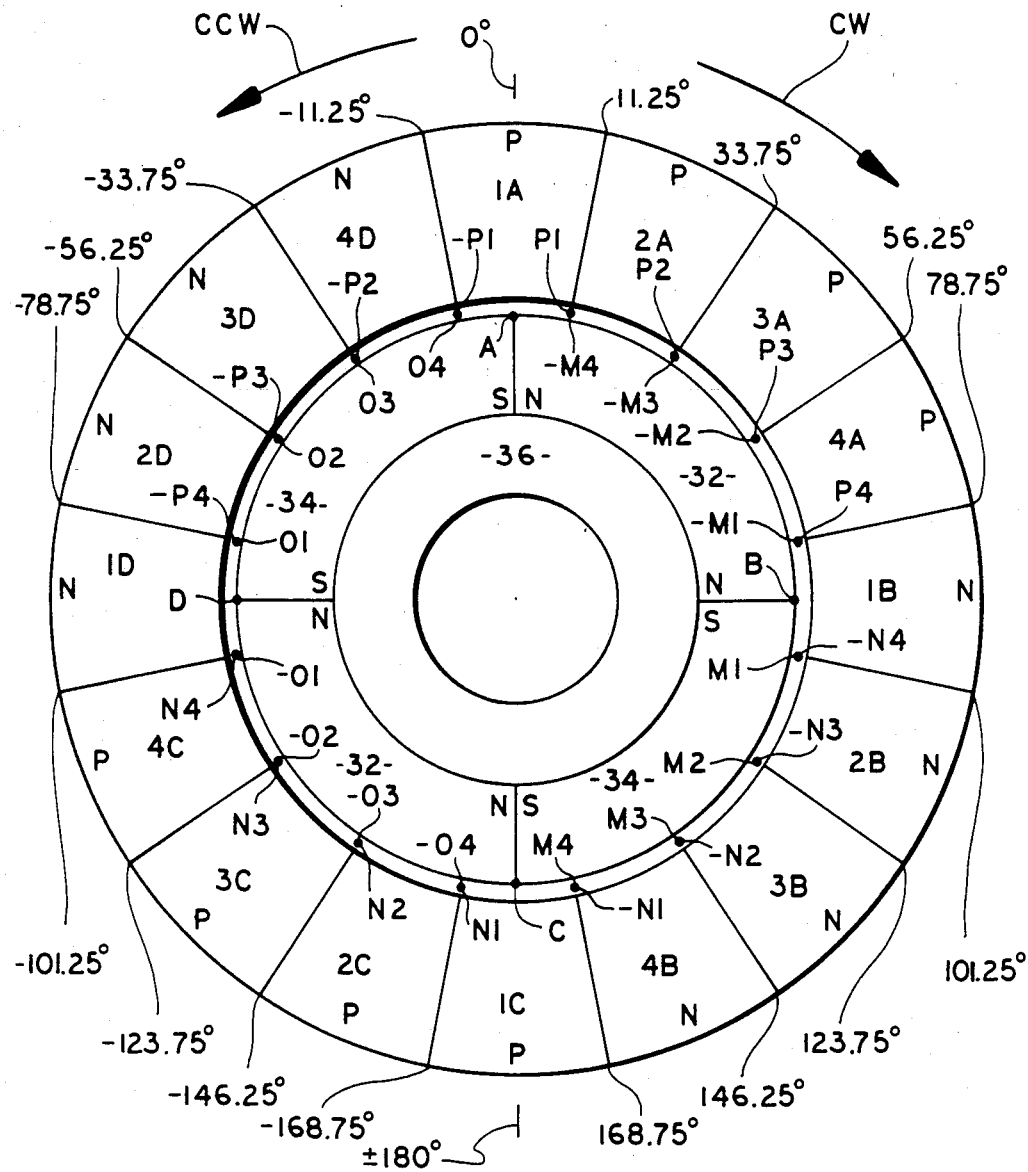
FIG. 6 is a diagrammatic representation of the interaction between the stator coils and the rotor magnets to illustrate the operation of the present invention.

Assume the initial position of the rotor 30 shown in FIG. 6. There, point A lies at an angle of 0 degrees and coils 1–4 are shown to have either a positive winding polarity P or a negative winding polarity N.

For the purpose of explanation, assume a convention that provides that positive current flow, into a coil having a positive winding polarity P, facing a north magnetic pole produces a clockwise torque. A change in either the direction of current flow, the winding polarity, or the polarity or the magnetic pole will produce a counter-clockwise torque. Since all but the direction of current flow are set by design, the production of counter torque is controlled the direction of current flow.

When the current is specified as being positive, windings A and C of the coils 1–4 exert a clockwise tangential force on the north poles 32 of the rotor 30. Simultaneously, since the windings B and D are reverse wound relative to windings A and C, the coil fields are reversed causing a tangential force in the opposite direction on a north pole and a force in the same direction on a south pole. Thus, the reverse windings provide means for generating additive force fields on opposite magnetic poles with current flow in a first direction.

Table 1A shows current polarities for clockwise commands from positive (+) instantaneous angular positions of point A with point P0 being at 0 degrees. Table 1B shows current polarities for clockwise commands from negative (−) instantaneous angular positions. Similarly, Table 2A shows current polarities for counter-clockwise commands from positive while Table 2B shows current polarities for counter-clockwise commands from negative positions.

Thus, Table 1A shows that when a clockwise command is received and point A is at an instantaneous angular position of between 0 and +11.25 degrees, coils 2, 3, and 4 are energized with a positive current as per the above-stated convention. Note that no current flows through coil 1. This minimizes scale factor nonlinearities while improving the efficiency of operation.

Further, if a clockwise command has been received when the rotor 30 is in such a position that point A lies in the area between points P1 and P2 (corresponding to an instantaneous angular position of from +11.25 to +33.75 degrees), the commutation logic 48 senses the position of the rotor 30 and provides appropriate signals to the controller 50. Thus, in accordance with Table 1A the controller 50 subsequently energizes coils 3 and 4 through the amplifiers 51 with a current of appropriate magnitude. Substantially simultaneously, coil 1 is energized with a current of opposite polarity. It thereby generates a corresponding magnetic field of opposite polarity. The effect is a tangential force on the south pole 34 of the rotor 30 that is additive to the tangential force on the north pole 32 of the rotor 30 caused by the simultaneous current flow through coils 3 and 4. Coil 2 is de-energized to once again minimize the cogging and frictional effects discussed above. Thus, a clockwise torque is produced in response to a clockwise torque with an efficiency of operation heretofore unshown by the prior art.

As illustrated in Tables 1 and 2, the coils may be energized to cause the rotor 30 to produce a clockwise or counter-clockwise torque as a function of any instantaneous angular position.

Thus, the present invention has been described with reference to a particular embodiment in a particular application. As mentioned above, a number of substitute materials may be used without departing from the scope of the invention. In addition, the number of phases may be changed to suit a particular design requirement. One of ordinary skill in the art will recognize that the invention may be implemented with an external rotor and internal windings. It is intended by the appended claims to cover any and all such modifications.

What is claimed is:

1. A multiple phase electronically commutated torque motor comprising:
   a stator having an annular stator element;
   coil means including at least two conductive windings wrapped about peripheral sections of said stator;
   a plurality of winding separators mounted around the periphery of said stator for insulating said windings;
   a rotor having a magnetic rotor element disposed within said stator for coplanar rotation therein about a pivot at the center of said stator, said rotor having at least two magnetic poles; and
   means for selectively energizing said windings to cause said rotor to undergo a pre-determined limited angular excursion relative to said stator in one of at least two possible directions of motion so as to provide a controlled substantially ripple free torque thereby, said angular excursion being less than one full continuous revolution in any one direction.

2. A multiple phase electronically commutated torque motor comprising:
   an annular rotor element for coplanar rotation therein about a pivot at the center of said rotor element;
   magnetic means mounted on said rotor element and including at least two poles of opposite magnetic polarity;
   a stator having a stator element disposed within said rotor element;
   coil means including at least two conductive windings wrapped about said stator; and
   a plurality of winding separators mounted around the periphery of said stator for insulating said windings;
   means for selectively energizing said windings to cause said rotor element to undergo a pre-determined limited angular excursion relative to said stator in one of at least two possible directions of motion so as to provide a controlled substantially ripple free torque thereby, said angular excursion being less than one full continuous revolution in any one direction.

3. A four phase electronically commutated torque motor comprising:
   a stator having an annular stator element;
   coil means including four sets of windings mounted on said stator element and providing four poles of magnetic polarity;
   a plurality of winding separators mounted around the periphery of said stator for insulating said windings;
   a rotor element having four magnets disposed within said stator element for mechanically independent relative coplanar rotation therein about an axis at the center of said stator; and
   means for selectively energizing said windings to cause said rotor to undergo a pre-determined limited angular excursion relative to said stator in one of at least two possible directions of motor so as to provides controlled substantially ripple free torque thereby, said angular excursion being less than one full continuous revolution in any one direction.

4. A method for driving a motor having a stator element with at least two windings and a rotor element with at least two magnetic poles including the steps of:
   (a) signaling a desired mode of operation of said motor and energizing said windings in response thereto to cause said rotor element to undergo a pre-determined limited angular excursion relative to said stator element in one of at least two possible directions of motion, said angular excursion being less than one full continuous revolution in any one direction;
   (b) determining the position of said rotor element relative to said stator element; and
   (c) selectively de-energizing said windings to provide a controlled substantially ripple free torque whereby said rotor element and said stator element undergo relative motion with minimal magnetic reluctance and friction.

5. The invention of claims 1, 2, or 3 including means for generating additive force fields on opposite magnetic poles with current flow in a first direction.

6. The invention of claim 5 wherein said means for generating additive force fields includes a coil having at least two windings oppositely wound relative to a common magnetic core.

* * * * *